United States Patent
Park et al.

(10) Patent No.: US 12,437,016 B2
(45) Date of Patent: Oct. 7, 2025

(54) FINE-TUNING LARGE LANGUAGE MODEL(S) USING REINFORCEMENT LEARNING WITH SEARCH ENGINE FEEDBACK

(71) Applicant: GOOGLE LLC, Mountain View, CA (US)

(72) Inventors: Hyun Jin Park, Palo Alto, CA (US); Changwan Ryu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/532,140

(22) Filed: Dec. 7, 2023

(65) Prior Publication Data

US 2025/0190506 A1    Jun. 12, 2025

(51) Int. Cl.
*G06F 40/20* (2020.01)
*G06F 16/9538* (2019.01)

(52) U.S. Cl.
CPC .......... *G06F 16/9538* (2019.01); *G06F 40/20* (2020.01)

(58) Field of Classification Search
None
See application file for complete search history.

(56) References Cited

U.S. PATENT DOCUMENTS

| | | | |
|---|---|---|---|
| 2018/0329998 A1* | 11/2018 | Thomson | H04N 21/42203 |
| 2024/0045990 A1* | 2/2024 | Boyer | G06F 40/279 |
| 2024/0249318 A1* | 7/2024 | Spiegel | H04L 51/02 |
| 2024/0281472 A1* | 8/2024 | LaRhette | G06F 16/90328 |
| 2024/0362417 A1* | 10/2024 | Imani | G06N 3/09 |
| 2025/0086235 A1* | 3/2025 | Kumar | G06N 3/08 |
| 2025/0117381 A1* | 4/2025 | Revach | G06F 16/24535 |

OTHER PUBLICATIONS

Dong, Q. et al., "Aligning the Capabilities of Large Language Models with the Context of Information Retrieval via Contrastive Feedback"; arXiv.org, Cornell University; arXiv:2309.17078; 11 pages; dated Sep. 29, 2023.
Nakano, R. et al., "WebGPT: Browser-assisted question-answering with human feedback"; arXiv.org, Cornell University; arXiv:2112.09332; 32 pages; dated Jun. 1, 2022.
Bacciu, A. et al., "RRAML: Reinforced Retrieval Augemented Machine Learning"; arXiv.org, Cornell University; arXiv:2307.12798; 9 pages; dated Jul. 24, 2023.

(Continued)

*Primary Examiner* — Eddy Cheung
(74) *Attorney, Agent, or Firm* — Gray Ice Higdon

(57) ABSTRACT

Various implementations are directed towards fine-tuning a large language model (LLM) using search engine feedback (e.g., responsive content generated based on a reference source material such as a set of search engine results). Additionally or alternatively, a supervision signal can be generated based on comparing search engine conditioned LLM output with unconditioned LLM output. In many implementations, the supervision signal(s) can be used in training a reward model using reinforcement learning, where the trained reward model can be used in fine-tuning the LLM.

20 Claims, 8 Drawing Sheets

(56) References Cited

OTHER PUBLICATIONS

Krishna, C.S.; "Prompt Generate Train (PGT): A framework for few-shot domain adaptation, alignment, and uncertainty calibration of a retriever augmented generation (RAG) model for domain specific open book question-answering"; arXiv.org, Cornell University; arXiv:2307.05915; 11 pages; dated Jul. 12, 2023.

Liu, X. et al., "WebGLM: Towards An Efficient Web-Enhanced Question Answering System with Human Preferences"; Proceedings of the 31st ACM International Conference on Multimedia; pp. 4549-4560; dated Aug. 6, 2023.

European Patent Office; International Search Report and Written Opinion issued in Application No. PCT/US2024/058966; 13 pages; dated Feb. 26, 2025.

\* cited by examiner

FINE-TUNING LARGE LANGUAGE MODEL(S) USING REINFORCEMENT LEARNING WITH SEARCH ENGINE FEEDBACK

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). Automated assistants typically rely upon a pipeline of components for interpreting and responding to natural language (NL) based inputs received during a dialog session. Large language models (LLMs) are particular types of machine learning models that are trained on enormous amounts of diverse data and that can perform various natural language processing (NLP) tasks. Recent developments have integrated aspects of LLMs into this pipeline of components for interpreting and responding to the NL based inputs. Generally, a dialog session with an automated assistant that is integrated with aspects of LLMs is initiated by a user providing a NL based input, and the automated assistant can generate a response to the NL based inputs using the aforementioned pipeline of components. Notably, these LLMs enable the automated assistant to reflect certain styles in generating the response.

SUMMARY

Implementations described herein are directed towards fine-tuning a large language model (LLM) using search engine feedback. In some implementations, fine-tuning the LLM can cause the LLM to generate more "factually-correct" responses. As described herein, one or more factually-correct responses (also referred to herein as one or more factually based response(s), search engine conditioned response(s), search engine conditioned output, etc.) can include responsive content generated based on a reference source material. In some implementations, the reference source material can include one or more sources recommended by a search engine.

Hallucination(s) can be generated using a LLM where the output is not factually based (e.g., the output generated by the LLM is factually incorrect). Some techniques attempt to address this by retrieving one or more search results corresponding to the NL based input and providing content therefrom as part of the prompt provided to the LLM, which can tailor the LLM output to such content. However, generating search engine result(s) for each LLM request causes significant resource computation, especially when considered across many requests (e.g., thousands of requests). Additionally or alternatively, generating search engine results at runtime requires the processing of a lengthy prompt including content based on the one or more search results by the LLM.

Various implementations described herein address these and other shortcomings by presenting particular techniques for reinforcement learning training of an LLM to mitigate hallucinations and instead to make responses, generated using the LLM, objectively more grounded in the search result(s), thus obviating the need to include content from search result(s) as part of a prompt to mitigate hallucinations.

In some implementations, the LLM can be fine-tuned using output generated by a reward model (RM). In some implementations, the RM can be trained using search engine based results. For example, the RM can be trained using a reinforcement learning framework. In a reinforcement learning framework, the output sequence generated using the LLM can be viewed as a sequence of actions (e.g., a trajectory) given a user query and previous action history. In some implementations, a reward for the LLM can include a supervision signal (e.g., a scalar value function of the LLM response(s)) where the supervision signal is based on the likelihood of the factual correctness of a given LLM response. A variety of reinforcement learning techniques can be used to determine the best response(s) (i.e., the policy) to maximize the reward (i.e., the supervision signal). Reinforcement learning techniques can include (but are not limited to) policy gradient method(s), Q-learning method(s), actor-critic method(s), model-based method(s), additional or alternative reinforcement learning method(s), and/or combinations thereof.

In some implementations, one or more search engine results can be used to determine a preferred response among multiple responses generated using the LLM. Additionally or alternatively, one or more search engine results can be used to generate one or more conditioned responses using the LLM (e.g., providing the one or more search engine results as input to the LLM to generate LLM responsive output). In some of those implementations, the system can pair the conditioned response(s) (e.g., generated based on processing the search result(s) using the LLM) with one or more unconditioned LLM responses (e.g., generated based on processing the input query using the LLM) to generate one or more example pairs including a preferred response and a non-preferred response. In some implementations, the example pairs can be used in training the reward model.

For example, the system can process an input of NL based input of "Who invented the telephone" using a LLM to generate raw LLM output (i.e., the unconditioned LLM response(s)) of "Alexander Graham Bell is credited with inventing the telephone. He was a Scottish-born scientist, inventor, and engineer who lived in the 19th century. On Mar. 10, 1876, Bell was granted a patent for an invention he called the "improvement in telegraphy", which was more commonly known as the telephone. This invention revolutionized the way people communicated with each other and paved the way for modern telecommunication technology."

Additionally or alternatively, the system can process the NL based input of "Who invented the telephone" using a search engine to generate a set of search results responsive to the NL based input. For example, the system can generate a set of search results which includes a first search result from the Library of Congress, a second search result from an online encyclopedia, and a third search result from a telecommunications company. Additionally or alternatively, the system can generate a text summary of one or more of the search results in the set of search results. Additionally or alternatively, the system can generate search engine conditioned NL input based on the set of search results (e.g., a text summary of each of the search results) and the NL based input. In some implementations, the search engine conditioned NL input can be processed using the LLM to generate the search engine conditioned output.

The system can generate a supervision signal based on comparing the raw LLM output (i.e., unconditioned LLM output) and the search engine conditioned output. For example, the supervision signal can be used to directly fine-tune the LLM, to train a reward model, etc. In some implementations, the reward model can be used to fine-tune the LLM, to generate a value indicating the likelihood LLM output is factually based and/or generated based on reference source materials, etc.

For example, the system can generate the search engine conditioned NL input which includes the summary of the first search result+the summary of the second search result+the summary of the third search result+NL based input of "Who invented the telephone". Additionally or alternatively, the system can process the search engine conditioned NL input using the LLM to generate the search engine conditioned output of "The telephone as we know it today is the result of the collective efforts and innovations of multiple inventors, including Alexander Graham Bell, Elisha Gray, and Antonio Meucci. Alexander Graham Bell is widely credited with inventing the first practical telephone and was awarded the first US patent for it in 1876. However, it was the result of the combined effort and contributions of several inventors and companies, including the Swedish telecommunications company Ericsson, which played a major role in the development and widespread adoption of the telephone." In some implementations, the system can generate the supervision signal based on the raw LLM output and the search engine conditioned output.

Accordingly, various implementations set forth techniques for automatically generating training instances for a reward model used in fine-tuning a LLM based on search engine results. The system can automatically generate a large volume of training instances on a variety of topics (where the system can automatically generate a number of training instances many orders of magnitude greater than what can be generated by a human reviewer). The greater number of training instances on a wider variety of topics can increase the accuracy of output generated using the reward model. The more accurate output generated using the reward model can in turn be used in fine-tuning the LLM to improve the factual accuracy of responses generated using the LLM.

As used herein, a "dialog" may include a logically-self-contained exchange between a user and automated assistant (and in some cases, other human participants). The automated assistant may differentiate between multiple dialogs with the user based on various signals, such as passage of time between dialogs, change of user context (e.g., location, before/during/after a scheduled meeting, etc.) between dialogs, detection of one or more intervening interactions between the user and the client device other than dialogs between the user and the automated assistant (e.g., the user switches applications for a while, the user walks away from then later returns to a standalone voice-activated product), locking/sleeping of the client device between dialogs, change of client devices used to interface with the automated assistant, and so forth. As used herein, a "turn" of a dialog may include an input provided by a user during a dialog. In some implementations, the turn of the dialog may be limited to the input provided by the user, whereas in other implementations, the turn of the dialog may include a prior response provided by the automated assistant to which the input provided by the user is responsive and/or a subsequent response provided by the automated assistant that is responsive to the input provided by the user.

The above description is provided as an overview of only some implementations disclosed herein. Those implementations, and other implementations, are described in additional detail herein. Further, it should be understood that techniques disclosed herein can be implemented locally on a client device, remotely by server(s) connected to the client device via one or more networks, and/or both.

DETAILED DESCRIPTION

Figure 1:
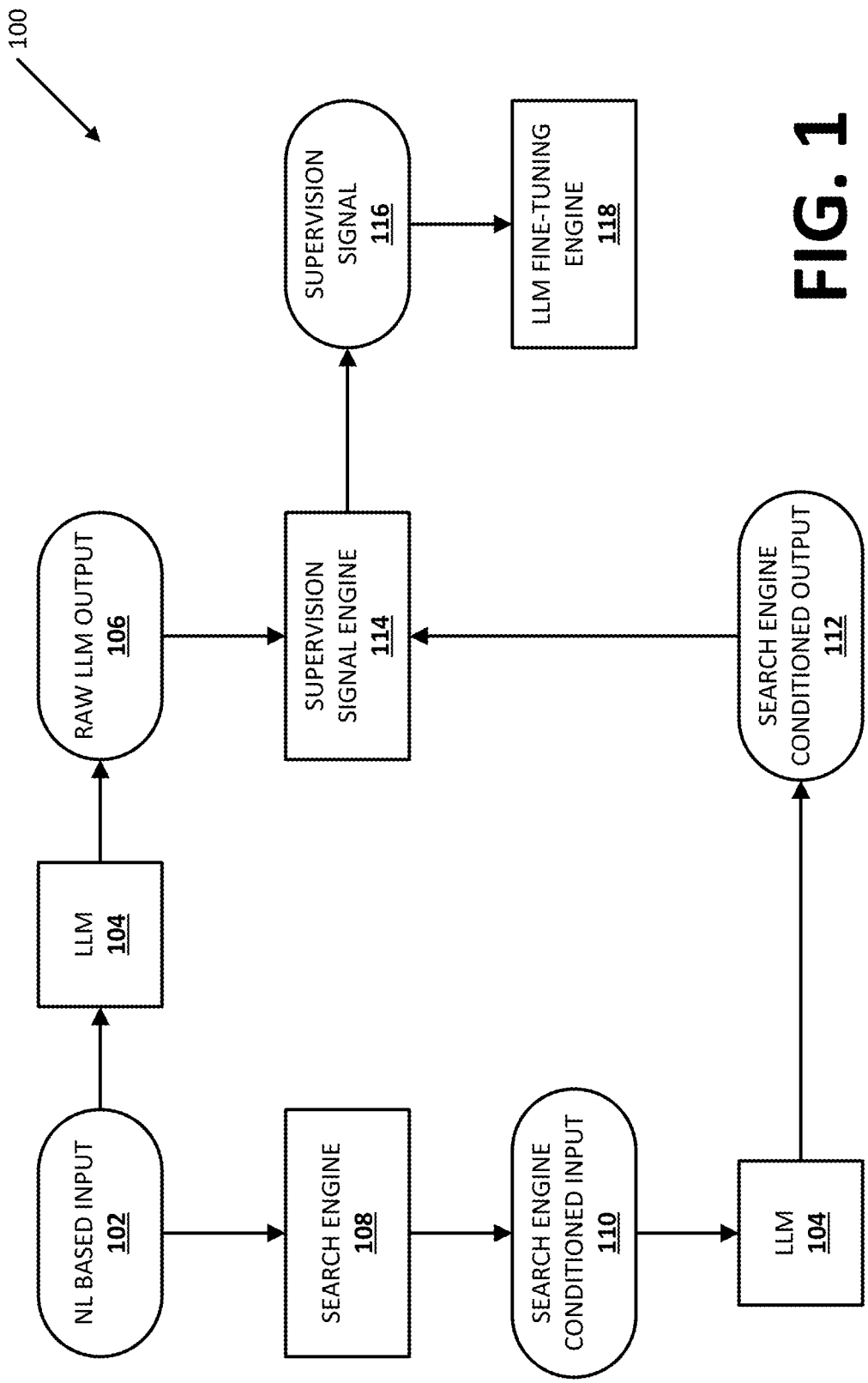
FIG. 1 illustrates an example of fine-tuning a large language model (LLM) based on a supervision signal in accordance with various implementations.

Turning now to the figures, FIG. 1 illustrates an example of fine-tuning a LLM directly based on a supervision signal. The illustrated example 100 includes processing NL based input 102 using LLM 104 to generate raw LLM output 106. The NL based input 102 can include a variety of natural language based input such as (but not limited to) NL text input provided by a user of a computing device, a text representation of an utterance spoken by the user of the computing device, one or more additional or alternative types of natural language based input, and/or combinations thereof. LLM 104 described herein can be any LLM (e.g., LaMDA, BERT, Meena, PaLM, GPT-3, GPT-4, etc.) that is capable of being utilized in processing NL based inputs and generating LLM outputs.

The raw LLM output 106 can include one or more instances of NL output responsive to the NL based input 102, generated based on processing the NL based input 102 using the LLM 104. Processing the NL based input using the LLM can generate a probability distribution over a sequence of words or phrases (not depicted) that are predicted to be responsive to the NL based input 102. In some implementations, the raw LLM output 106 can include one or more instances of NL output based on processing the probability distribution.

For example, the NL based input 102 can be the NL query of "Who invented the telephone". The query of "Who invented the telephone" can be processed using the LLM 104 to generate the raw LLM output 106 of "Alexander Graham Bell is credited with inventing the telephone. He was a Scottish-born scientist, inventor, and engineer who lived in the 19th century. On Mar. 10, 1876, Bell was granted a patent for an invention he called the "improvement in telegraphy", which was more commonly known as the telephone. This invention revolutionized the way people communicated with each other and paved the way for modern telecommunication technology."

Additionally or alternatively, the NL based input 102 can be processed using a search engine 108 to generate one or more search engine results. The search engine conditioned NL input 110 can be generated based on the one or more search engine results. Search result(s) can be used in generating a variety of search engine conditioned NL input in accordance with various implementations. For example, search engine conditioned NL input 306 as described herein with respect to FIG. 3 can include a text summary of one or more of the search results+the NL based input. Additionally or alternatively, search engine conditioned NL input 504 as described herein with respect to FIG. 5 can include a query asking whether a first instance of raw LLM output or a second instance of raw LLM output makes more sense given the search results and/or a text summary of the search results.

In some implementations, the search engine conditioned input 110 can be processed using the LLM 104 to generate one or more instances of search engine conditioned output 112, where the search engine conditioned output 112 is natural language responsive to the search engine conditioned input 110.

For instance, the NL based input 102 of "Who invented the telephone" can be processed using the search engine 108 to generate search engine conditioned input 110, where the search engine conditioned input 110 includes a first search result from the Library of Congress, a second search result form an online encyclopedia, and a third search result from a telecommunications company. In some of those implementations, a summary of one or more of the search results (i.e., one or more instances of search engine conditioned input 110) can be processed using the LLM 104 to generate the one or more instances of search engine conditioned output 112.

In some implementations, the raw LLM output 106 and the search engine conditioned output 112 can be processed using a supervision signal engine 114 to generate a supervision signal 116. Additionally or alternatively, the supervision signal 116 can be processed using LLM fine-tuning engine 118 to fine-tune the LLM 104.

Figure 2:
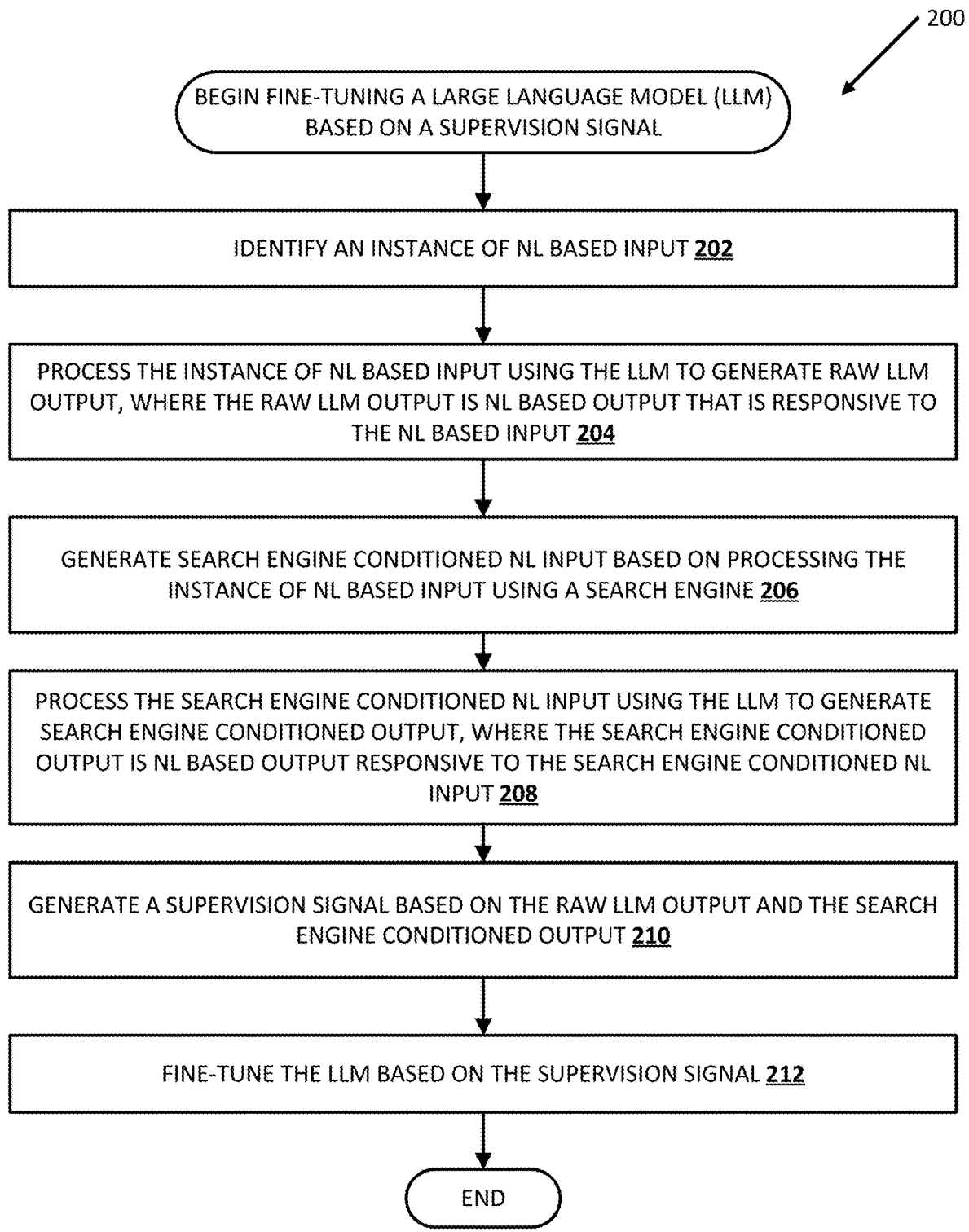
FIG. 2 illustrates a flowchart depicting an example process of fine-tuning a LLM based on a supervision signal in accordance with various implementations.

FIG. 2 is a flowchart illustrating an example process 200 of fine-tuning a LLM based on a supervision signal in accordance with various implementations described herein. For convenience, the operations of process 200 are described with reference to a system that performs the operations. This system can include one or more components of a computer system, such as computer system 810. Moreover, while operations of process 200 are shown in a particular order, this is not meant to be limiting. One or more operations can be reordered, omitted, and/or added.

At block 202, the system identifies an instance of NL based input. In some implementations, the NL based input can include text input provided by a user of a computing device, a text representation of an utterance spoken by the user of a computing device, one or more additional or alternative types of natural language input, and/or combinations thereof. For example, the system can identify the NL based input 102 of "Who invented the telephone" as described herein.

At block 204, the system processes the instance of NL based input using the LLM to generate raw LLM output. In some implementations, the raw LLM output is NL based output that is responsive to the NL based input. For example, the system can process the NL based input of "Who invented the telephone" to generate raw LLM output 106 of "Alexander Graham Bell is credited with inventing the telephone. He was a Scottish-born scientist, inventor, and engineer who lived in the 19th century. On Mar. 10, 1876, Bell was granted a patent for an invention he called the "improvement in telegraphy", which was more commonly known as the telephone. This invention revolutionized the way people communicated with each other and paved the way for modern telecommunication technology."

At block 206, the system generates search engine conditioned NL input based on processing the instance of NL based input using a search engine. For example, search engine conditioned NL input 110 as described herein can be generated based on one or more search engine results. Search result(s) can be used in generating a variety of search engine conditioned NL input in accordance with various implementations. For example, search engine conditioned NL input 306 as described herein with respect to FIG. 3 can include a text summary of one or more of the search results+the NL based input. Additionally or alternatively, search engine conditioned NL input 504 as described herein with respect to FIG. 5 can include a query asking whether a first instance of raw LLM output or a second instance of raw LLM output makes more sense as a response to the NL based input given the search results and/or a text summary of the search results.

At block 208, the system processes the search engine conditioned NL input using the LLM to generate search engine conditioned output. In some implementations, the search engine conditioned output is NL based output responsive to the search engine conditioned NL input. For example, the system can process the search engine conditioned NL input using the LLM to generate search engine conditioned output 112 as described herein.

At block 210, the system generates a supervision signal based on the raw LLM output and the search engine conditioned output. For example, the system can generate the supervision signal 116 as described herein.

At block 212, the system fine-tunes the LLM based on the supervision signal. For example, LLM fine-tuning engine 118 as described herein can use the supervision signal 116 to directly fine-tune the LLM. As an additional or alternative example, the supervision signal 116 can be processed using the LLM fine-tuning engine 118 to train a reward model as described herein. For example, the supervision signal 116 can be used in training a reward model.

Figure 3:
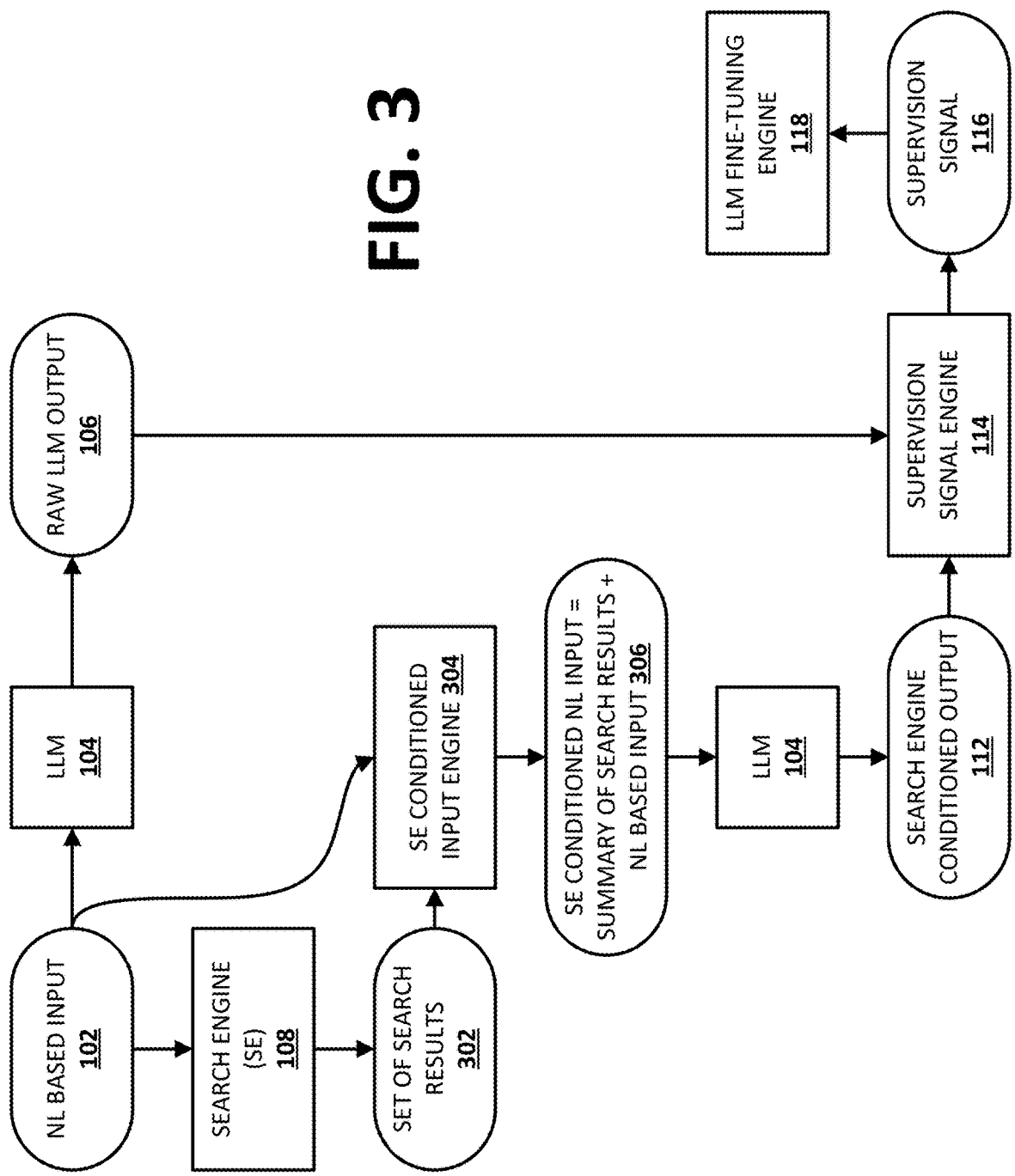
FIG. 3 illustrates an example of generating a supervision signal based on search engine conditioned LLM output and raw LLM output in accordance with various implementations.

FIG. 3 illustrates example 300 of generating a supervision signal to use in fine-tuning a LLM in accordance with various implementations described herein. The system includes processing an instance of NL based input 102 using a LLM 104 to generate raw LLM output 106. Additionally or alternatively, the instance of NL based input 102 can be processed using a search engine 108 to generate a set of search results 302. In some implementations, the NL based input 102, LLM 104, the raw LLM output 106, and the search engine 108 are described herein with respect to FIG. 1. The set of search results 302 can include one or more results (e.g., links to web content, images, documents, summaries of content, one or more additional or alternative types of content, and/or combinations thereof), where each search result in the set of search results 302 is responsive to the NL based input 102. In some implementations, the set of search results 302 provides additional information and/or links to additional information that might change the answer generated by the LLM responsive to the NL based input 102.

For example, the NL based input 102 can be the NL query of "Who invented the telephone". The query of "Who invented the telephone" can be processed using the LLM 104 to generate the raw LLM output 106 of "Alexander Graham Bell is credited with inventing the telephone. He was a Scottish-born scientist, inventor, and engineer who lived in the 19th century. On Mar. 10, 1876, Bell was granted a patent for an invention he called the "improvement in telegraphy", which was more commonly known as the telephone. This invention revolutionized the way people communicated with each other and paved the way for modern telecommunication technology."

Additionally or alternatively, the NL based input 102 of "Who invented the telephone" can be processed using the search engine 108 to generate the set of search results 302, where the set of search results 302 includes a first search result from the Library of Congress, a second search result form an online encyclopedia, and a third search result from a telecommunications company.

In some implementations, the NL based input 102, the set of search results 302, one or more additional or alternative items of content (not depicted), and/or combinations thereof can be processed using search engine conditioned input engine 304 to generate search engine conditioned NL input 306. In some implementations, search engine conditioned NL input 306 can include a text summary of one or more of the search engine results (in the set of search engine results 302) and the NL based input 102. Additionally or alternatively, the search engine conditioned NL input 306 can be processed using the LLM 104 to generate one or more instances of search engine conditioned output 112.

For example, the system can generate a text summary of the first search result from the Library of Congress of "Alexander Graham Bell is widely credited with inventing the telephone. He was awarded the first US patent for an "improvement in telegraphy" in 1867, which described the process of transmitting vocal or musical sounds telegraphically. However, several inventors such as Elisha Gray and Antonio Meucci had also developed similar devices and made substantial contributions to the invention of the telephone. It is important to note that the telephone as we know it today is the result of the collective efforts and innovations of multiple inventors and not just the work of one individual."

Similarly, the system can generate a text summary of the second search result from the online encyclopedia of "Alexander Graham Bell (1847-1822) was a Scottish-born scientist, inventor, engineer, and innovator who is credited with inventing the first practical telephone. He also made significant contributions to the fields of communication and sound recording. Bell's mother and wife were both deaf, which led him to devote much of his life to research in communication methods for the deaf. In addition to the telephone, he also patented the photophone (a device that transmitted sound on a beam of light), an early version of the metal detector, and an early version of the telephone transmitter. He was a co-founder of the American Telephone and Telegraph Company (AT&T) and a founding member of the National Geographic Society. Bell was widely recognized for his achievements during his lifetime and remains one of the most influential figures in communication technology.

Furthermore, the system can generate a text summary of the third search result from a telecommunications company of "A Swedish telecommunications company, played a major role in the invention of the telephone. Alexander Graham Bell is credited with inventing the first practical telephone in 1896, but the development of the telephone was a collaborative effort involving multiple inventors and companies. Ericsson, which was founded in 1867, was one of the first companies to manufacture telephones and telephone exchanges on a large scale. Ericsson's founder, Lars Magnus Ericsson, was an early believer in the potential of the telephone and saw the opportunity to create a global network of connected individuals. Under his leadership, Ericsson played a crucial role in the spread of telephone technology around the world and helped to make telephones widely accessible to the public. Today, Ericsson continues to innovate and develop new technologies to connect people and organizations across the globe."

In some implementations, the search engine conditioned input engine 304 can generate the search engine conditioned NL input 306 based on the text summaries of one or more search results in the set of search results 302 and the NL based input 102. As an illustrative example, the search engine conditioned input engine 304 can generate the search engine conditioned NL input 306 which includes the summary of the first search result+the summary of the second search result+the summary of the third search result+NL based input of "Who invented the telephone?". The system can process the search engine conditioned NL input 306 using the LLM 104 to generate search engine conditioned output 112. For instance, the system can process the search engine conditioned NL input 306 which includes the summary of the first search result+the summary of the second search result+the summary of the third search result+NL based input of "Who invented the telephone?" using the LLM 104 to generate the search engine conditioned output 112 of "The telephone as we know it today is the result of the collective efforts and innovations of multiple inventors, including Alexander Graham Bell, Elisha Gray, and Antonio Meucci. Alexander Graham Bell is widely credited with inventing the first practical telephone and was awarded the first US patent for it in 1876. However, it was the result of the combined effort and contributions of several inventors and companies, including the Swedish telecommunications company Ericsson, which played a major role in the development and widespread adoption of the telephone." In some implementations, the search engine conditioned output 112, when compared to the raw LLM output 106, can include output representing and/or combining more diverse sources of information based on credible search results.

The system can process the raw LLM output 106 and the search engine conditioned output 112 using the supervision signal engine 114 to generate a supervision signal 116. In some implementations, LLM fine-tuning engine 118 can use the supervision signal 116 to directly fine-tune the LLM (e.g., LLM 104). Additionally or alternatively, the supervision signal 116 can be processed using the LLM fine-tuning engine 118 to train a reward model.

Figure 4:
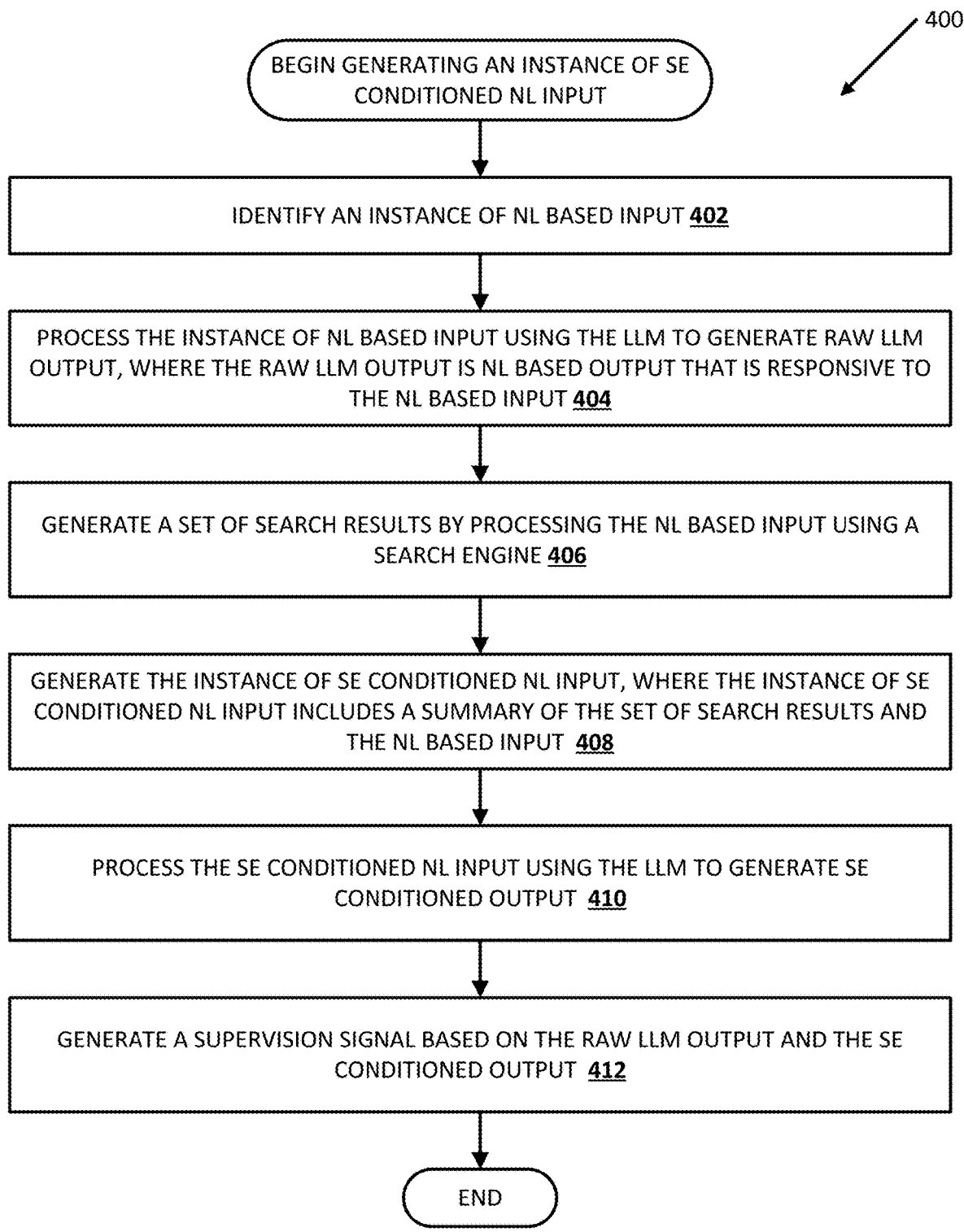
FIG. 4 illustrates a flowchart depicting an example process of generating a supervision signal based on search engine conditioned LLM output and raw LLM output in accordance with various implementations.

FIG. 4 is a flowchart illustrating an example process 400 of generating an instance of search engine conditioned NL input in accordance with various implementations described herein. For convenience, the operations of process 400 are described with reference to a system that performs the operations. This system can include one or more components of a computer system, such as computer system 810. Moreover, while operations of process 400 are shown in a particular order, this is not meant to be limiting. One or more operations can be reordered, omitted, and/or added.

At block 402, the system identifies an instance of NL based input. For example, the system can identify the NL based input 102 of "Who invented the telephone" as described herein.

At block 404, the system processes the instance of NL based input using a LLM to generate raw LLM output. In some implementations, the raw LLM output is NL based output that is responsive to the NL based input. For example, the system can process the NL based input of "Who invented the telephone" to generate raw LLM output 106 of "Alexander Graham Bell is credited with inventing the telephone. He was a Scottish-born scientist, inventor, and engineer who lived in the 19th century. On Mar. 10, 1876, Bell was granted a patent for an invention he called the "improvement in telegraphy", which was more commonly known as the telephone. This invention revolutionized the way people communicated with each other and paved the way for modern telecommunication technology."

At block 406, the system generates a set of search results by processing the NL based input using a search engine. For example, the system can generate the set of search results 302 as described herein which includes a first search result from the Library of Congress, a second search result form an online encyclopedia, and a third search result from a telecommunications company. Additionally or alternatively, the system can generate a text summary of one or more of the search results in the set of search results.

For example, the system can generate a text summary of the first search result from the Library of Congress of "Alexander Graham Bell is widely credited with inventing the telephone. He was awarded the first US patent for an "improvement in telegraphy" in 1867, which described the process of transmitting vocal or musical sounds telegraphically. However, several inventors such as Elisha Gray and Antonio Meucci had also developed similar devices and made substantial contributions to the invention of the telephone. It is important to note that the telephone as we know it today is the result of the collective efforts and innovations of multiple inventors and not just the work of one individual."

Similarly, the system can generate a text summary of the second search result from the online encyclopedia of "Alexander Graham Bell (1847-1822) was a Scottish-born scientist, inventor, engineer, and innovator who is credited with inventing the first practical telephone. He also made significant contributions to the fields of communication and sound recording. Bell's mother and wife were both deaf, which led him to devote much of his life to research in communication methods for the deaf. In addition to the telephone, he also patented the photophone (a device that transmitted sound on a beam of light), an early version of the metal detector, and an early version of the telephone transmitter. He was a co-founder of the American Telephone and Telegraph Company (AT&T) and a founding member of the National Geographic Society. Bell was widely recognized for his achievements during his lifetime and remains one of the most influential figures in communication technology.

Furthermore, the system can generate a text summary of the third search result from a telecommunications company of "A Swedish telecommunications company, played a major role in the invention of the telephone. Alexander Graham Bell is credited with inventing the first practical telephone in 1896, but the development of the telephone was a collaborative effort involving multiple inventors and companies. Ericsson, which was founded in 1867, was one of the first companies to manufacture telephones and telephone exchanges on a large scale. Ericsson's founder, Lars Magnus Ericsson, was an early believer in the potential of the telephone and saw the opportunity to create a global network of connected individuals. Under his leadership, Ericsson played a crucial role in the spread of telephone technology around the world and helped to make telephones widely accessible to the public. Today, Ericsson continues to innovate and develop new technologies to connect people and organizations across the globe."

At block 408, the system generates the instance of search engine conditioned NL input. In some implementations, the instance of search engine conditioned input includes (a) a summary of the set of search results and (b) the NL based input. In some implementations, the system can generate the search engine conditioned NL input 306 as described herein with respect to FIG. 3. For example, the system can generate the search engine conditioned NL input which includes the summary of the first search result+the summary of the second search result+the summary of the third search result+ NL based input of "Who invented the telephone?".

At block 410, the system processes the search engine conditioned NL input using the LLM to generate search engine conditioned output. In some implementations, the system can generate the search engine conditioned output 112 as described herein. For example, the system can generate the search engine conditioned output of "The telephone as we know it today is the result of the collective efforts and innovations of multiple inventors, including Alexander Graham Bell, Elisha Gray, and Antonio Meucci. Alexander Graham Bell is widely credited with inventing the first practical telephone and was awarded the first US patent for it in 1876. However, it was the result of the combined effort and contributions of several inventors and companies, including the Swedish telecommunications company Ericsson, which played a major role in the development and widespread adoption of the telephone."

At block 412, the system generates a supervision signal based on the raw LLM output and the search engine conditioned output. In some implementations, the supervision signal can be used to train a reward model to predict a preferred response for a set of responses (e.g., a pair of responses). For example, the supervision signal can indicate one or more ranked response pairs such as ((ResponseA), (ResponseB)), where ResponseA is based on the raw LLM output and ResponseB is based on the search engine conditioned output, where the supervision signal indicates a preference for the response based on the search engine conditioned output.

For instance, the system can generate the ranked response pair of (("Alexander Graham Bell is credited with inventing the telephone. He was a Scottish-born scientist, inventor, and engineer who lived in the 19th century. On Mar. 10, 1876, Bell was granted a patent for an invention he called the "improvement in telegraphy", which was more commonly known as the telephone. This invention revolutionized the way people communicated with each other and paved the way for modern telecommunication technology."), ("The telephone as we know it today is the result of the collective efforts and innovations of multiple inventors, including Alexander Graham Bell, Elisha Gray, and Antonio Meucci. Alexander Graham Bell is widely credited with inventing the first practical telephone and was awarded the first US patent for it in 1876. However, it was the result of the combined effort and contributions of several inventors and companies, including the Swedish telecommunications company Ericsson, which played a major role in the development and widespread adoption of the telephone.")).

Figure 5:
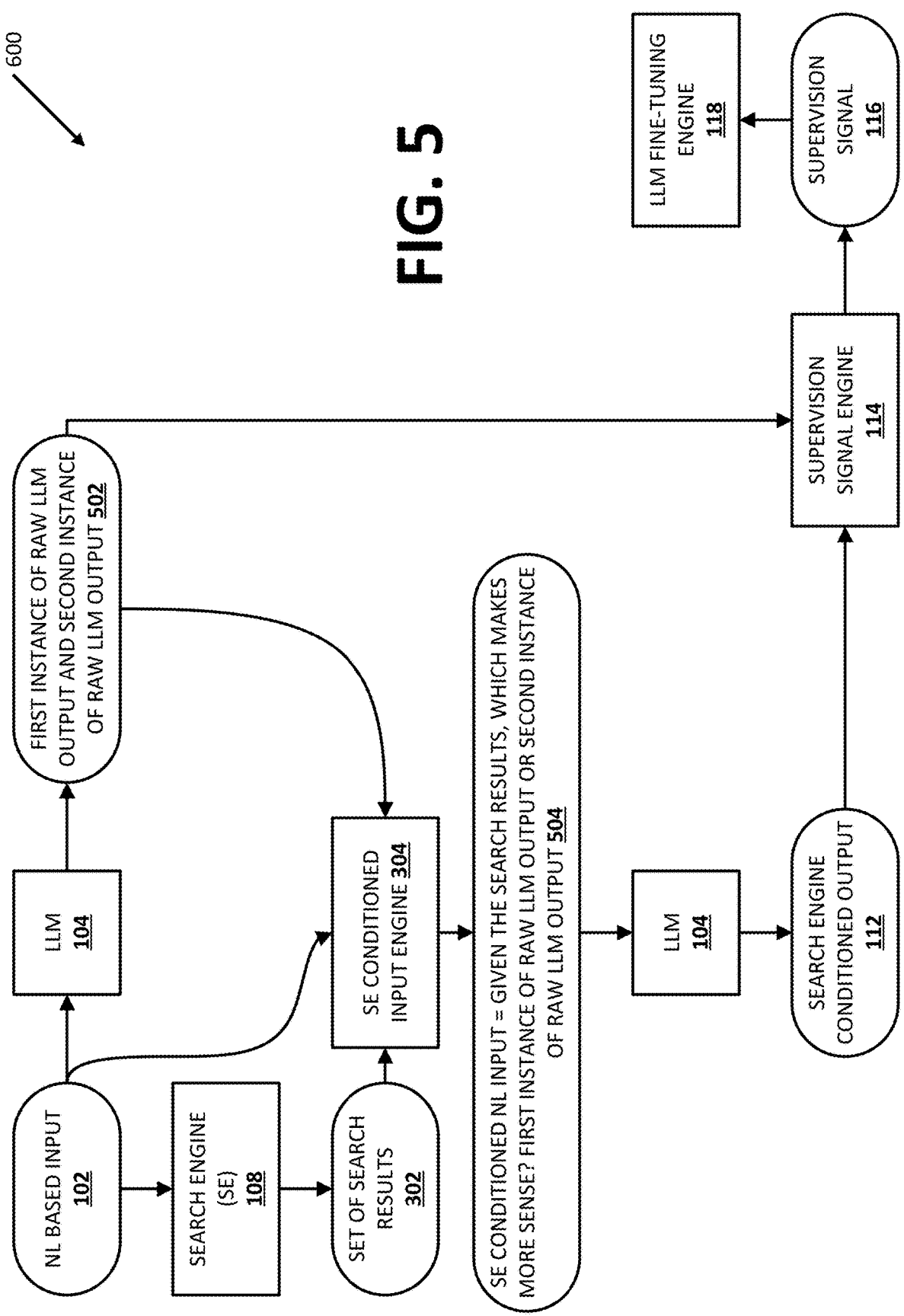
FIG. 5 illustrates an example of generating a supervision signal for use in fine-tuning an LLM in accordance with various implementations described herein.

FIG. 5 illustrates an example 500 of generating a supervision signal for use in fine-tuning an LLM in accordance with various implementations described herein. The system includes processing NL based input 102 using a LLM 104 to generate raw LLM output including at least a first instance of raw LLM output and a second instance of raw LLM output 502. Additionally or alternatively, the system can process the NL based input 102 using a search engine to generate a set of search results 302. In some implementations, the NL based input 102, LLM 104, the raw LLM output 106, and the search engine 108 are described herein with respect to FIG. 1 and/or FIG. 3. The set of search results 302 can include one or more results (e.g., links to web content, images, documents, summaries of content, one or more additional or alternative types of content, and/or combinations thereof), where each search result in the set of search results 302 is responsive to the NL based input 102. In some implementations, the set of search results 302 provides additional information and/or links to additional information that might change the answer generated by the LLM responsive to the NL based input 102.

For example, the NL based input 102 can be the NL query of "Who invented the telephone". The query of "Who invented the telephone" can be processed using the LLM 104 to generate to raw LLM output 502 including at least a first instance of raw LLM output and a second instance of raw LLM output.

For example, the system can generate a first instance of raw LLM output of "Alexander Graham Bell is credited with inventing the telephone. He was a Scottish-born scientist, inventor, and engineer who lived in the 19th century. On Mar. 10, 1876, Bell was granted a patent for an invention he called the "improvement in telegraphy", which was more commonly known as the telephone. This invention revolutionized the way people communicated with each other and paved the way for modern telecommunication technology."

Additionally or alternatively, the system can generate a second instance of raw LLM output of "The telephone was invented by Alexander Graham Bell. Bell was a Scottish-born inventor, scientist, and teacher who was working in Boston, Massachusetts, in the United States in the late 1700s. He filed his patent for the telephone on Feb. 14, 1876, and went on to found Bell Telephone Company, which would become one or the largest telecommunications companies in the world. While there were other inventors working on similar technologies at the time, Bell is credited with being the first to patent a working telephone and is widely recognized as the inventor of the device.

Similarly, the system can generate additional and/or alternative instances of raw LLM output including: (a) "The telephone was invented by Alexander Graham Bell in 1876. Bell was a Scottish-born inventor, scientist, and teacher who was living and working in Boston, Massachusetts when he developed the device. He filed his patent for the telephone on Feb. 14, 1876, and it was officially granted on Mar. 7, 1876. Bell's invention revolutionized communication and paved the way for the development of many other communication technologies that we use today."; (b) "The telephone was invented by Alexander Graham Bell. Bell was a Scottish-born scientist, inventor, and teacher who is credited with inventing and patenting the first practical telephone in 1876. He worked on development of the telephone with his assistant Thomas Watson, and the first words transmitted over the phone were Bell saying, "Mr. Watson, come here, I want to see you." The invention of the telephone revolutionized communication and played a significant role in shaping the modern world."; (c) "The telephone was intended by Alexander Graham Bell in 1876. Bell was a Scottish-born inventor and scientist who is also known for his work on deafness and speech. He is credited with inventing the first practical telephone and is considered one of the most important inventors in history."; (e) "Alexander Graham Bell is credited with inventing the telephone. He was a Scottish-born inventor and teacher of the deaf, who was awarded the first US patent for the invention of the telephone in 1876. However, there were several other inventors who were working on similar devices at the time, including Elisha Gray, who filed a patent for a similar device on the same day as Bell. Despite the controversy over who actually invented the telephone, Bell is generally considered to be the primary inventor and his invention revolutionized communication and had a profound impact on society."

In some implementations, search engine conditioned input engine 304 can process the set of search results 302 and the instances of raw LLM output including at least the first instance of raw LLM output and the second instance of raw LLM output to generate search engine conditioned NL input 504. In some implementations, the search engine conditioned NL input 504 can include can include a query asking whether a first instance of raw LLM output or a second instance of raw LLM output makes more sense as a response to the NL based input given the search results and/or a text summary of the search results.

The search engine conditioned NL input 504 can be processed using the LLM 104 to generate search engine conditioned output 112. In some implementations, supervision signal engine 114 can be used to process the search engine conditioned output 112 and the raw LLM output 502 including at least the first instance of raw LLM output and the second instance of raw LLM output to generate the supervision signal 116. Additionally or alternatively, the LLM fine-tuning engine 118 can be used to fine-tune the LLM based on processing the supervision signal 116. In some implementations, LLM fine-tuning engine 118 can use the supervision signal 116 to directly fine-tune the LLM (e.g., LLM 104). Additionally or alternatively, the supervision signal 116 can be processed using the LLM fine-tuning engine 118 to train a reward model. For example, the supervision signal 116 can be used in training a reward model as described herein with respect to FIG. 8 and/or FIG. 9.

For example, the system can generate the search engine conditioned NL input 504 including a query asking whether the first instance of raw LLM output of: "Alexander Graham Bell is credited with inventing the telephone. He was a Scottish-born scientist, inventor, and engineer who lived in the 19th century. On Mar. 10, 1876, Bell was granted a patent for an invention he called the "improvement in telegraphy", which was more commonly known as the telephone. This invention revolutionized the way people communicated with each other and paved the way for modern telecommunication technology."; or a second instance of raw LLM output of: "Alexander Graham Bell is credited with inventing the telephone. He was a Scottish-born inventor and teacher of the deaf, who was awarded the first US patent for the invention of the telephone in 1876. However, there were several other inventors who were working on similar devices at the time, including Elisha Gray, who filed a patent for a similar device on the same day as Bell. Despite the controversy over who actually invented the telephone, Bell is generally considered to be the primary inventor and his invention revolutionized communication and had a profound impact on society.", which makes more sense as a response to the NL based input of "Who invented the telephone" given a text summary of a first search result from the Library of Congress+a text summary of a second search result from an online encyclopedia+and a text summary of a third search result from a telecommunications company.

Additionally or alternatively, the system can generate the search engine conditioned output 112 indicating the second instance of raw LLM output of "Alexander Graham Bell is credited with inventing the telephone. He was a Scottish-born inventor and teacher of the deaf, who was awarded the first US patent for the invention of the telephone in 1876. However, there were several other inventors who were working on similar devices at the time, including Elisha Gray, who filed a patent for a similar device on the same day as Bell. Despite the controversy over who actually invented the telephone, Bell is generally considered to be the primary inventor and his invention revolutionized communication and had a profound impact on society." makes more sense because it is more based on the provided search results.

Figure 6:
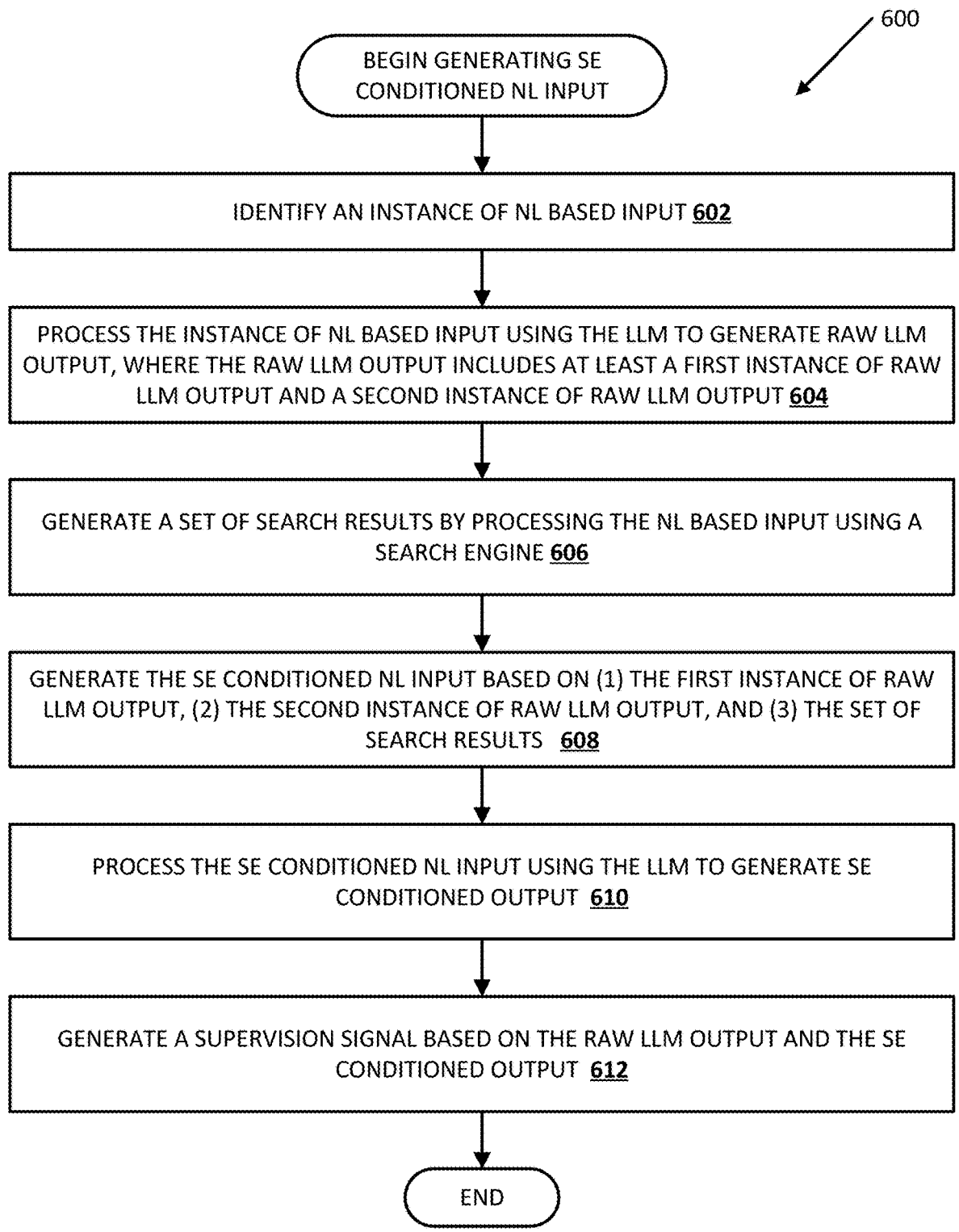
FIG. 6 illustrates a flowchart depicting an example process of generating a supervision signal in accordance with various implementations described herein.

FIG. 6 is a flowchart illustrating an example process 600 of generating a supervision signal in accordance with various implementations described herein. For convenience, the operations of process 600 are described with reference to a system that performs the operations. This system can include one or more components of a computer system, such as computer system 810. Moreover, while operations of process 600 are shown in a particular order, this is not meant to be limiting. One or more operations can be reordered, omitted, and/or added.

At block 602, the system identifies an instance of NL based input. For example, the system can identify the NL based input 102 of "Who invented the telephone" as described herein.

At block 604, the system processes the instance of NL based input using the LLM to generate raw LLM output including at least a first instance of raw LLM output and a second instance of raw LLM output. In some implementations, the raw LLM output is NL based output that is responsive to the NL based input. In some implementations, the system can process the instance of NL based input 102 using the LLM 104 to generate the first instance of raw LLM output and the second instance of raw LLM output 502 as described herein. For example, the system can process the NL based input of "Who invented the telephone" to generate a first instance of raw LLM output of "Alexander Graham Bell is credited with inventing the telephone. He was a Scottish-born scientist, inventor, and engineer who lived in the 19th century. On Mar. 10, 1876, Bell was granted a patent for an invention he called the "improvement in telegraphy", which was more commonly known as the telephone. This invention revolutionized the way people communicated with each other and paved the way for modern telecommunication technology."; and the second instance of raw LLM output of: "Alexander Graham Bell is credited with inventing the telephone. He was a Scottish-born inventor and teacher of the deaf, who was awarded the first US patent for the invention of the telephone in 1876. However, there were several other inventors who were working on similar devices at the time, including Elisha Gray, who filed a patent for a similar device on the same day as Bell. Despite the controversy over who actually invented the telephone, Bell is generally considered to be the primary inventor and his invention revolutionized communication and had a profound impact on society."

At block 606, the system generates a set of search results by processing the NL based input using a search engine. For example, the system can generate the set of search results 302 including a first search result from the Library of Congress, a second search result form an online encyclopedia, and a third search result from a telecommunications company as described herein.

At block 608, the system generates the search engine conditioned NL input based on (1) the first instance of raw LLM output, (2) the second instance of raw LLM output, and (3) the set of search results. In some implementations, the system can generate the search engine conditioned NL input 504 as described herein with respect to FIG. 5.

For example, the system can generate the search engine conditioned NL input 504 including a query asking whether the first instance of raw LLM output of: "Alexander Graham Bell is credited with inventing the telephone. He was a Scottish-born scientist, inventor, and engineer who lived in the 19th century. On Mar. 10, 1876, Bell was granted a patent for an invention he called the "improvement in telegraphy", which was more commonly known as the telephone. This invention revolutionized the way people communicated with each other and paved the way for modern telecommunication technology."; or a second instance of raw LLM output of: "Alexander Graham Bell is credited with inventing the telephone. He was a Scottish-born inventor and teacher of the deaf, who was awarded the first US patent for the invention of the telephone in 1876. However, there were several other inventors who were working on similar devices at the time, including Elisha Gray, who filed a patent for a similar device on the same day as Bell. Despite the controversy over who actually invented the telephone, Bell is generally considered to be the primary inventor and his invention revolutionized communication and had a profound impact on society.", which makes more sense as a response to the NL based input of "Who invented the telephone" given a text summary of a first search result from the Library of Congress+a text summary of a second search result from an online encyclopedia+and a text summary of a third search result from a telecommunications company.

At block 610, the system processes the search engine conditioned NL input using the LLM to generate search engine conditioned output. In some implementations, the system can generate the search engine conditioned output 112 as described herein with respect to FIG. 5. For example, the system can generate the search engine conditioned output 112 indicating the second instance of raw LLM output of "Alexander Graham Bell is credited with inventing the telephone. He was a Scottish-born inventor and teacher of the deaf, who was awarded the first US patent for the invention of the telephone in 1876. However, there were several other inventors who were working on similar devices at the time, including Elisha Gray, who filed a patent for a similar device on the same day as Bell. Despite the controversy over who actually invented the telephone, Bell is generally considered to be the primary inventor and his invention revolutionized communication and had a profound impact on society." makes more sense because it is more based on the provided search results.

At block 612, the system generates a supervision signal based on the raw LLM output and the search engine conditioned output. In some implementations, the supervision signal can be used to directly fine-tune a LLM. Additionally or alternatively, the supervision signal can be used in training a reward model.

While many examples of generating a supervision signal are described herein with respect to FIG. 3, FIG. 4, FIG. 5, and FIG. 6, these examples are merely illustrative and are not meant to be limiting. Additional or alternative supervision signals can be generated in accordance with some embodiments of the invention. For example, a supervision signal can be generated based on a combination of search engine conditioned NL input 306 and search engine conditioned input 504.

Figure 7:
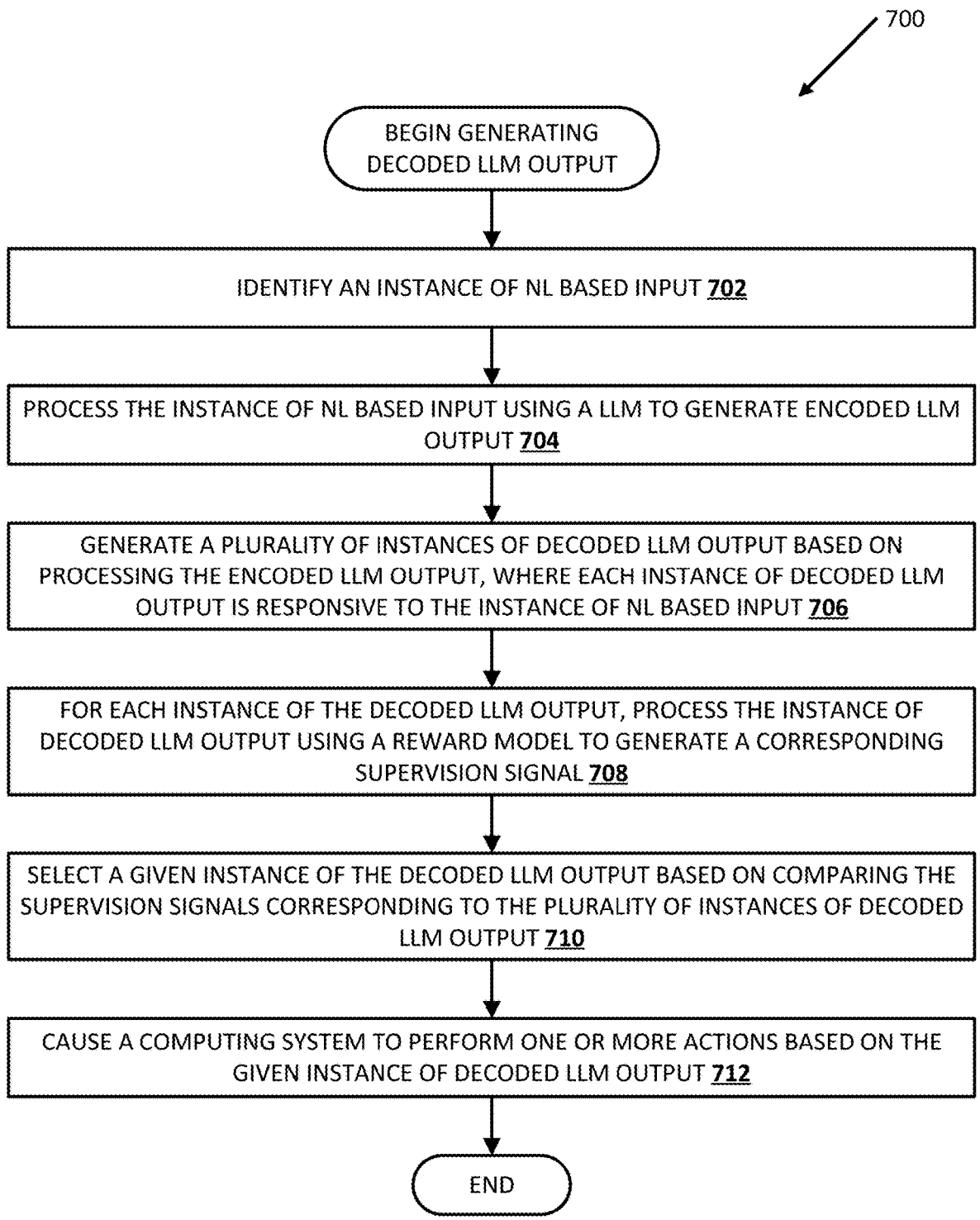
FIG. 7 illustrates a flowchart depicting an example process of generating LLM output based on a supervision signal in accordance with various implementations described herein.

FIG. 7 is a flowchart illustrating an example process 700 of generating LLM output based on a supervision signal in accordance with various implementations described herein. For convenience, the operations of process 700 are described with reference to a system that performs the operations. This system can include one or more components of a computer system, such as computer system 810. Moreover, while operations of process 700 are shown in a particular order, this is not meant to be limiting. One or more operations can be reordered, omitted, and/or added.

At block 702, the system identifies an instance of NL based input. In some implementations, the system can identify NL based input 102 as described herein with respect to FIG. 1. For example, the instance of NL based input can be a NL query such as "What are tourist attractions in Canada". In some of those implementations, the instance of NL based input can be text based input provided by a user of a computing device, a text representation of a spoken utterance spoken by the user of a computing device, one or more additional or alternative forms of NL based input, and/or combinations thereof.

At block 704, the system processes the instance of NL based input using a LLM to generate encoded LLM output. In some implementations, the encoded LLM output can include an encoded representation of the probability distribution over a sequence of words or phrases that are predicted to be responsive to the instance of NL based input.

At block 706, the system generates a plurality of instances of decoded LLM output based on processing the encoded LLM output, where each instance of decoded LLM output is responsive to the instance of NL based input.

At block 708, for each instance of the decoded LLM output, the system processes the instance of decoded LLM output using a reward model to generate a corresponding supervision signal. In some implementations, the supervision signal is a value indicating a likelihood that the corresponding instance of decoded LLM output is factually based and/or generated based on reference source materials.

At block 710, the system selects a given instance of the decoded LLM output based on comparing the supervision signals corresponding to the plurality of instances of decoded LLM output. In some implementations, the system can select the given instance of decoded LLM output based on the corresponding signal indicating the given instance of decoded LLM output is most likely to be factually based and/or generated based on reference source materials. In some implementations, the given instance of decoded LLM output can be selected based on only the corresponding supervision signal. Additionally or alternatively, the given instance of decoded LLM output can be selected based on the corresponding supervision signal and one or more additional or alternative signals. For instance, the one or more additional or alternative signals can include the context of the dialog session, the context of one or more historical dialog sessions, the location of the client device, the time the system receives the NL based input, the day of the week the system receives the NL based input, one or more other signals, and/or combinations thereof.

In some implementations, the system can determine a weight to give the supervision signal in selecting the given instance of decoded LLM output. For example, the system can increase or decrease the weight of the supervision signal based on determining whether the supervision signal satisfies a threshold value (e.g., increase the weight of the supervision signal when the value exceeds a threshold value, decrease the weight of the supervision signal when the value is below a threshold value, etc.). Additionally or alternatively, the system can increase or decrease the weight of the supervision signal based on the availability of one of the one or more additional or alternative signals and/or the value corresponding to the one or more additional or alternative signals.

At block 712, the system causes a computing system to perform one or more actions based on the given instance of decoded LLM output. In some implementations, the system can render output for the user based on the given instance of decoded LLM output. Additionally or alternatively, the system can cause the client device to perform one or more actions based on the given instance of decoded LLM output (e.g., control a smart device, transmit a message to another user, etc.).

Figure 8:
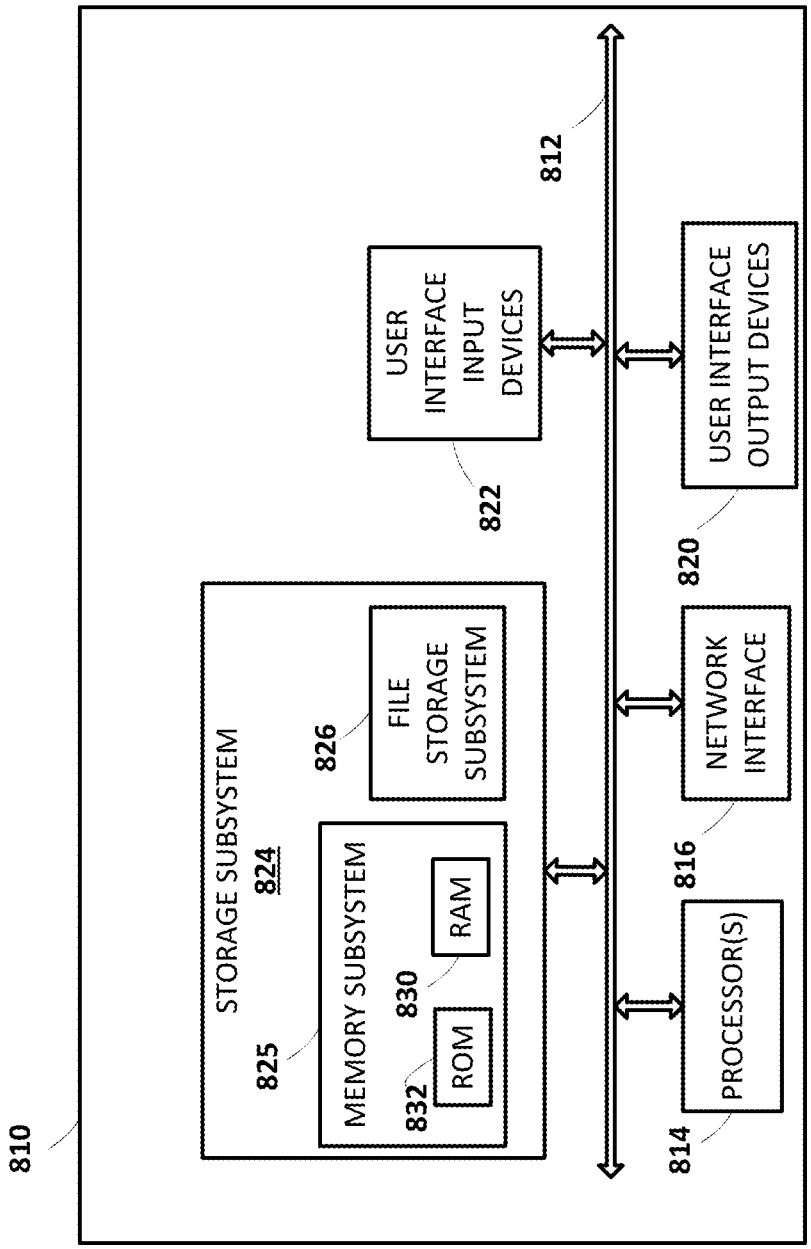
FIG. 8 depicts an example architecture of a computing device, in accordance with various implementations.

Turning now to FIG. 8, a block diagram of an example computing device 810 that may optionally be utilized to perform one or more aspects of techniques described herein is depicted. In some implementations, one or more of a client device, cloud-based automated assistant component(s), and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIGS. 1 and 2.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges.

The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method includes identifying an instance of natural language (NL) based input. In some implementations, the method includes processing the instance of NL based input using a large language model (LLM) to generate raw LLM output, where the raw LLM output is NL based output that is responsive to the NL based input. In some implementations, the method includes generating an instance of search engine conditioned NL input based on processing the instance of NL based input using a search engine. In some implementations, the method includes processing the instance of search engine conditioned NL input using the LLM to generate an instance of search engine conditioned output, where the instance of search engine conditioned output is NL based output. In some implementations, the method includes generating a supervision signal based on the raw LLM output and the search engine conditioned output. In some implementations, the method includes fine-tuning the LLM based on the supervision signal.

These and other implementations of technology disclosed herein can optionally include one or more of the following features.

In some implementations, fine-tuning the LLM based on the supervision signal includes training a reward model based on the supervision signal. In some implementations, the method further includes using the trained reward model in fine-tuning the LLM using reinforcement learning techniques. In some versions of those implementations, training the reward model based on the supervision signal includes processing the raw LLM output and the search engine conditioned output using the reward model to generate a predicted reward. In some versions of those implementations, the method further includes generating a predicted loss based on processing the supervision signal and the predicted reward, wherein the supervision signal indicates a preference for the search engine conditioned output over the raw LLM output. In some versions of those implementations, the method further includes updating one or more portions of the reward model based on the predicted loss.

In some implementations, generating the instance of search engine conditioned NL input based on processing the instance of NL based input using the search engine includes processing the NL based input using the search engine to generate a set of search engine result, wherein each search engine results, in the set of search engine results, is responsive to the instance of NL based input. In some implementations, the method further includes generating the instance of search engine conditioned NL input based on the set of search engine results and the instance of NL based input.

In some implementations, the raw LLM output includes at least (1) a first instance of raw LLM output that is NL output responsive to the NL based input, and (2) a second instance of raw LLM output that is NL output responsive to the NL based input. In some versions of those implementations, generating the instance of search engine conditioned NL input based on processing the instance of NL based input using the search engine includes processing the NL based input using the search engine to generate a set of search engine results, where each search engine result, in the set of search engine results, is responsive to the instance of NL based input. In some implementations, the method further includes generating the instance of search engine conditioned NL input based on the set of search engine results, the first instance of raw LLM output, and the second instance of raw LLM output.

In some implementations, training the reward model based on the supervision signal includes processing the raw LLM output and the search engine conditioned output using the reward model to generate a predicted reward. In some implementations, the method further includes generating a predicted loss based on processing the supervision signal and the predicted reward, wherein the supervision signal is a confidence value indicating likelihood the raw LLM output corresponds to the search engine conditioned output. In some implementations, the method further includes updating one or more portions of the reward model based on the predicted loss.

In some implementations, the raw LLM output that is NL based output responsive to the NL based input includes at least a first instance of raw LLM output. In some versions of those implementations, generating the instance of search engine conditioned NL input based on processing the instance of NL based input using the search engine includes processing the NL based input using the search engine to generate a set of search engine results, where each search engine result, in the set of search engine results, is responsive to the instance of NL based input. In some implementations, the method further includes generating the instance of search engine conditioned NL input based on the set of search engine results and the first instance of raw LLM output.

In some implementations, generating the instance of search engine conditioned NL input based on the set of search engine results and the instance of NL based input includes generating a text summary of the set of search results, wherein the text summary includes a portion of text corresponding to each of the search results in the set of search results. In some implementations, the method further includes generating the instance of search conditioned NL input based on the text summary of the set of search results and the instance of NL based input. In some versions of those implementations, generating the instance of search engine conditioned NL input based on the set of search engine results, the first instance of raw LLM output, and the second instance of raw LLM output includes generating a text summary of the set of search results, wherein the text summary includes a portion of text corresponding to each of the search results in the set of search results. In some versions of those implementations, the method further includes generating the instance of search engine conditioned NL input based on the text summary of the set of search results, the first instance of raw LLM output, and the second instance of raw LLM output, wherein the search conditioned NL input includes a query to determine whether to select the first instance of raw LLM output or the second instance of raw LLM output based on the text summary of the set of search results.

In some implementations, fine-tuning the LLM based on the supervision signal includes updating one or more portions of the LLM based on the supervision signal.

In some implementations, the instance of NL based input is text input provided by a user of a computing device.

In some implementations, the instance of NL based input is a text representation of a spoken utterance spoken by the user.

In some implementations, a method implemented by one or more processors is provided, the method includes identifying an instance of natural language (NL) based input. In some implementations, the method includes processing the instance of NL based input using a large language model (LLM) to generate encoded LLM output. In some implementations, the method includes generating a plurality of instances of decoded LLM output based on processing the encoded LLM output, wherein each instance of the decoded LLM output, in the plurality of instances of decoded LLM output, is NL based output that is responsive to the NL based input. In some implementations, for each instance of decoded LLM output, in the plurality of instances of decoded LLM output, and until one or more conditions are satisfied, the method includes generating a solicitation signal corresponding to the instance of decoded LLM output, wherein generating the solicitation signal corresponding to the instance of decoded LLM output comprises processing the instance of decoded LLM output using a reward model, and wherein the reward model is trained to generate output indicating a preference for search engine conditioned output. In some implementations, the method includes selecting a given instance of decoded LLM output based on comparing the solicitation signals corresponding to the plurality of instances of decoded LLM output. In some implementations, the method includes causing a computing system to perform one or more actions based on the given instance of decoded LLM output.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
    identifying an instance of natural language (NL) based input;
    processing the instance of NL based input using a large language model (LLM) to generate raw LLM output, where the raw LLM output is NL based output that is responsive to the NL based input;
    generating an instance of search engine conditioned NL input based on processing the instance of NL based input using a search engine;
    processing the instance of search engine conditioned NL input using the LLM to generate an instance of search engine conditioned output, where the instance of search engine conditioned output is NL based output;
    generating a supervision signal based on the raw LLM output and the search engine conditioned output; and
    fine-tuning the LLM based on the supervision signal.

2. The method of claim 1, wherein fine-tuning the LLM based on the supervision signal comprises:
    training a reward model based on the supervision signal; and
    using the trained reward model in fine-tuning the LLM using reinforcement learning techniques.

3. The method of claim 2, wherein training the reward model based on the supervision signal comprises:
    processing the raw LLM output and the search engine conditioned output using the reward model to generate a predicted reward;
    generating a predicted loss based on processing the supervision signal and the predicted reward, wherein the supervision signal indicates a preference for the search engine conditioned output over the raw LLM output; and
    updating one or more portions of the reward model based on the predicted loss.

4. The method of claim 3, wherein generating the instance of search engine conditioned NL input based on processing the instance of NL based input using the search engine comprises:
    processing the NL based input using the search engine to generate a set of search engine results, wherein each search engine result, in the set of search engine results, is responsive to the instance of NL based input; and
    generating the instance of search engine conditioned NL input based on the set of search engine results and the instance of NL based input.

5. The method of claim 3, wherein the raw LLM output includes at least (1) a first instance of raw LLM output that is NL output responsive to the NL based input, and (2) a second instance of raw LLM output that is NL output responsive to the NL based input, and wherein generating the instance of search engine conditioned NL input based on processing the instance of NL based input using the search engine comprises:
    processing the NL based input using the search engine to generate a set of search engine results, where each search engine result, in the set of search engine results, is responsive to the instance of NL based input; and generating the instance of search engine conditioned NL input based on the set of search engine results, the first instance of raw LLM output, and the second instance of raw LLM output.

6. The method of claim 2, wherein training the reward model based on the supervision signal comprises:

processing the raw LLM output and the search engine conditioned output using the reward model to generate a predicted reward;

generating a predicted loss based on processing the supervision signal and the predicted reward, wherein the supervision signal is a confidence value indicating likelihood the raw LLM output corresponds to the search engine conditioned output; and updating one or more portions of the reward model based on the predicted loss.

7. The method of claim 6, wherein the raw LLM output that is NL based output responsive to the NL based input includes at least a first instance of raw LLM output, and wherein generating the instance of search engine conditioned NL input based on processing the instance of NL based input using the search engine comprises:

processing the NL based input using the search engine to generate a set of search engine results, where each search engine result, in the set of search engine results, is responsive to the instance of NL based input; and generating the instance of search engine conditioned NL input based on the set of search engine results and the first instance of raw LLM output.

8. The method of claim 5, wherein generating the instance of search engine conditioned NL input based on the set of search engine results and the instance of NL based input comprises:

generating a text summary of the set of search results, wherein the text summary includes a portion of text corresponding to each of the search results in the set of search results; and generating the instance of search engine conditioned NL input based on the text summary of the set of search results and the instance of NL based input.

9. The method of claim 5, wherein generating the instance of search engine conditioned NL input based on the set of search engine results, the first instance of raw LLM output, and the second instance of raw LLM output comprises:

generating a text summary of the set of search results, wherein the text summary includes a portion of text corresponding to each of the search results in the set of search results; and generating the instance of search engine conditioned NL input based on the text summary of the set of search results, the first instance of raw LLM output, and the second instance of raw LLM output, wherein the search engine conditioned NL input includes a query to determine whether to select the first instance of raw LLM output or the second instance of raw LLM output based on the text summary of the set of search results.

10. The method of claim 1, wherein fine-tuning the LLM based on the supervision signal comprises:

updating one or more portions of the LLM based on the supervision signal.

11. The method of claim 1, wherein the instance of NL based input is text input provided by a user of a computing device.

12. The method of claim 1, wherein the instance of NL based input is a text representation of a spoken utterance spoken by the user.

13. A method implemented by one or more processors, the method comprising:

identifying an instance of natural language (NL) based input;

processing the instance of NL based input using a large language model (LLM) to generate encoded LLM output;

generating a plurality of instances of decoded LLM output based on processing the encoded LLM output, wherein each instance of the decoded LLM output, in the plurality of instances of decoded LLM output, is NL based output that is responsive to the NL based input;

for each instance of decoded LLM output, in the plurality of instances of decoded LLM output, and until one or more conditions are satisfied:

generating a solicitation signal corresponding to the instance of decoded LLM output, wherein generating the solicitation signal corresponding to the instance of decoded LLM output comprises processing the instance of decoded LLM output using a reward model, and wherein the reward model is trained to generate output indicating a preference for search engine conditioned output based on a reference source material;

selecting a given instance of decoded LLM output based on comparing the solicitation signals corresponding to the plurality of instances of decoded LLM output; and causing a computing system to perform one or more actions based on the given instance of decoded LLM output.

14. The method of claim 13, wherein identifying the instance of NL based input comprises:

identifying an instance of text input provided by a user of the computing system.

15. The method of claim 13, wherein identifying the instance of NL based input comprises:

identifying audio data capturing an utterance spoken by the user of the computing system;

generating a text representation of the utterance based on processing the instance of audio data using an automatic speech recognition model; and identifying the instance of NL based input based on the generated text representation of the utterance.

16. The method of claim 13, wherein causing the computing system to perform the one or more actions based on the given instance of decoded LLM output comprises:

rendering output via the computing system based on the given instance of decoded LLM output.

17. A system comprising:

one or more processors; and memory storing instructions that, when executed by the one or more processors, cause the one or more processors to perform operations that include:

identifying an instance of natural language (NL) based input;

processing the instance of NL based input using a large language model (LLM) to generate raw LLM output, where the raw LLM output is NL based output that is responsive to the NL based input;

generating an instance of search engine conditioned NL input based on processing the instance of NL based input using a search engine;

processing the instance of search engine conditioned NL input using the LLM to generate an instance of search engine conditioned output, where the instance of search engine conditioned output is NL based output;

generating a supervision signal based on the raw LLM output and the search engine conditioned output; and fine-tuning the LLM based on the supervision signal.

18. The system of claim 17, wherein fine-tuning the LLM based on the supervision signal comprises:

training a reward model based on the supervision signal; and using the trained reward model in fine-tuning the LLM using reinforcement learning techniques.

19. The system of claim 18, wherein training the reward model based on the supervision signal comprises:

processing the raw LLM output and the search engine conditioned output using the reward model to generate a predicted reward;

generating a predicted loss based on processing the supervision signal and the predicted reward, wherein the supervision signal indicates a preference for the search engine conditioned output over the raw LLM output; and updating one or more portions of the reward model based on the predicted loss.

20. The system of claim 19, wherein generating the instance of search engine conditioned NL input based on processing the instance of NL based input using the search engine comprises:

processing the NL based input using the search engine to generate a set of search engine results, wherein each search engine result, in the set of search engine results, is responsive to the instance of NL based input; and generating the instance of search engine conditioned NL input based on the set of search engine results and the instance of NL based input.

* * * * *